US011983862B2

(12) United States Patent
Sadeghi Borujeni et al.

(10) Patent No.: US 11,983,862 B2
(45) Date of Patent: May 14, 2024

(54) INSPECTION DEVICE AND METHOD FOR CHECKING AN OBJECT PRODUCED BY SINTERING FOR DEFECTS

(71) Applicant: Volkswagen Aktiengesellschaft, Wolfsburg (DE)

(72) Inventors: Shahrooz Sadeghi Borujeni, Wolfsburg (DE); Sven Crull, Braunschweig (DE); Yasin Bayzidi, Braunschweig (DE)

(73) Assignee: Volkswagen A en gesellschaft, Wolfsburg (DE)

( * ) Notice: Subject to any disclaimer, the term of this patent is extended or adjusted under 35 U.S.C. 154(b) by 451 days.

(21) Appl. No.: 17/518,214

(22) Filed: Nov. 3, 2021

(65) Prior Publication Data

US 2022/0138929 A1  May 5, 2022

(30) Foreign Application Priority Data

Nov. 3, 2020 (DE) .......................... 102020213828.1

(51) Int. Cl.
*G06K 9/00* (2022.01)
*G01N 21/88* (2006.01)
*G06T 7/00* (2017.01)

(52) U.S. Cl.
CPC ....... *G06T 7/0008* (2013.01); *G01N 21/8851* (2013.01); *G06T 2207/30108* (2013.01)

(58) Field of Classification Search
CPC ........ G06T 7/0008; G06T 2207/30108; G01N 21/8851
See application file for complete search history.

(56) References Cited

U.S. PATENT DOCUMENTS

| 5,894,345 A | 4/1999 | Takamoto et al. |
| 2016/0300338 A1 | 10/2016 | Zafar et al. |
| 2017/0232517 A1 | 8/2017 | Morton et al. |

(Continued)

FOREIGN PATENT DOCUMENTS

| AT | 514553 B1 | 2/2015 |
| CN | 103344694 A | 10/2013 |

(Continued)

OTHER PUBLICATIONS

Corresponding Chinese Application No. 2021112697312. Office Action (Jan. 17, 2024).

(Continued)

*Primary Examiner* — Avinash Yentrapati
(74) *Attorney, Agent, or Firm* — Peter Zura; LOZA & LOZA, LLP

(57) ABSTRACT

An inspection device and a method for checking an object produced by sintering for potential defects, wherein if at least one predefined prerequisite is satisfied, at least one image is recorded of at least part of the object via an imaging device in the inspection device, and it is checked by the inspection device whether a defect can be detected in the object in at least one image. A predication relating to a potential defect in the object is provided to the inspection device prior to recording the at least one image, and at least one imaging parameter is determined on the basis of the prediction, wherein the at least one image is recorded on the basis of the at least one determined imaging parameter.

20 Claims, 4 Drawing Sheets

(56) References Cited

U.S. PATENT DOCUMENTS

| | | | |
|---|---|---|---|
| 2018/0307209 A1* | 10/2018 | Chin | B22F 10/28 |
| 2019/0102880 A1* | 4/2019 | Parpara | B29C 51/46 |
| 2020/0001529 A1 | 1/2020 | Sugawara et al. | |
| 2020/0160497 A1* | 5/2020 | Shah | G06T 7/001 |
| 2020/0175669 A1* | 6/2020 | Bian | G06T 7/0004 |
| 2022/0335586 A1* | 10/2022 | Yahashi | G06T 11/00 |

FOREIGN PATENT DOCUMENTS

| | | | |
|---|---|---|---|
| CN | 103748670 A | 4/2014 | |
| CN | 104777174 A | 6/2016 | |
| CN | 107369136 A | 11/2017 | |
| CN | 109829883 A | 5/2019 | |
| CN | 110609037 A | 12/2019 | |
| CN | 111325717 A | 6/2020 | |
| EP | 3299801 A2 | 3/2018 | |
| EP | 3467793 A1 | 4/2019 | |
| JP | H11157946 A | 6/1999 | |
| JP | 2000123771 A | 4/2000 | |
| JP | 2019059645 A | 4/2019 | |
| JP | 2020001302 A | 1/2020 | |
| WO | 2018064066 A1 | 4/2018 | |

OTHER PUBLICATIONS

Li et al. "Nondestructive analysis of Jingdezhen and Longquan celadon wares excavated from Nanhai No. 1 Shipwreck." Spectroscopy and Spectral Analysis, vol. 36, No. 5, pp. 1500-1507 (May 2016).

Chen et al. "Auto-detection method of cylindrical workpiece surface cracks based on magnetic particle inspection." Bearing 2017, No. 3 (Mar. 13, 2017).

Song et al. "Experimental study on fatigue cracking in pre-corroded aluminum alloy 2024-T4 via digital image correction." Journal of Aeronautical Materials, 2020, vol. 40, No. 2, pp. 43-52).

* cited by examiner

INSPECTION DEVICE AND METHOD FOR CHECKING AN OBJECT PRODUCED BY SINTERING FOR DEFECTS

CROSS REFERENCE TO RELATED APPLICATION

The present application claims priority to German Patent App. No 10 2020 213 828.1, to Sadeghi Borujeni, et al., filed Nov. 3, 2020, the contents of which is incorporated by reference in its entirety herein.

FIELD OF TECHNOLOGY

The present disclosure relates to a technologies and techniques for checking an object produced by sintering for potential defects by means of an inspection device, wherein, if at least one specific prerequisite is satisfied, at least one image of at least one part of the object is recorded using an imaging device in the inspection device, and this image is checked to see whether a defect can be identified in the object in the at least one image. The present disclosure also includes an inspection device for checking an object produced by sintering for potential defects.

BACKGROUND

Objects produced using a 3D printing process may be subsequently subjected to a sintering process. This is described, by way of example, in US 2018/0307209 A1. This may result in a deformation of the object. To avoid this, an initial model of the object can be provided that is broken down into individual segments, and which defines the object or item. A modified geometry can be calculated for each segment that compensates for an anticipated deformation. The printing parameters that define the geometry of the printed object can subsequently be adjusted, such that the final printed object does not exhibit the anticipated deformation.

In addition to these deformations, other defects may also occur with 3D printing, in particular due to subsequent sintering, such as cracks in the object. These cracks cannot be prevented with the compensation process described therein.

US 2019/0102880 A1 describes an inspection process for inspecting orthodontic devices that have been produced for a specific individual. The image can be compared to an injection molded part, in particular by overlaying or underlaying, thus forming the basis for producing the part. Defects can be detected through differences. This approach is also not suitable for objects produced by 3D printing, in particular those subjected to sintering, because these objects normally cannot be produced on the basis of a prototype made with an injection molding process.

In order to detect defects in objects produced by sintering, in particular cracks, manual inspections are therefore usually carried out, i.e. the finished object is inspected by a human being. This may mean that very small cracks are overlooked.

US 2020/0160497 A1 describes a method for detecting defects in objects made with 3D printing using a machine. The object is first lit, and numerous images are taken of this object, in particular, images of different parts of the object. These images are then analyzed using a machine-learning model that has been trained to identify various manufacturing defects.

Although this results in an automated inspection of 3D-printed objects, it is extremely complicated. It would be desirable to be able to make an automatic inspection with less difficulty.

SUMMARY

Aspects of the present disclosure are therefore to create a method and an inspection device for checking an object produced by sintering for defects, which enable an automatic examination of such an object in the most efficient manner.

These aspects are achieved with the features described in the independent claims. Advantageous embodiments of the present disclosure are also provided in the subject matter of the dependent claims, the description, and the drawings.

In some examples, a method is disclosed for checking an object produced by sintering for defects using an inspection device, if at least one predefined prerequisite is satisfied, at least one image of at least part of the object is recorded using an imaging device in the inspection device, and then checked by the inspection device for any defects in the at least one image. The inspection device predicts a possible defect for this prior to recording the at least one image, and if the predefined prerequisite is satisfied, at least one recording parameter is determined on the basis of the prediction, wherein the at least one image is recorded on the basis of this at least one recording parameter.

Aspects of the present disclosure have an advantage that it is not necessary to take numerous random images of the object that is to be inspected from various perspectives in order to detect any possible defects, and instead, the images can be recorded on the basis of anticipated defects in the object. These images can therefore be recorded in a targeted manner aimed at those areas of the object where defects such as cracks can be expected based on the prediction. As a result, significantly fewer images must be evaluated in order to be able to detect these defects in the object, in particular cracks. This results in a particularly simple and efficient inspection process. It is also less likely that any defects will be overlooked, unlike with a manual inspection, because it is possible to search for defects where they can be expected on the basis of the prediction in a targeted manner. If, for example, a very small crack is anticipated in a very small part of the object, an image can be made, for example, of this very small area, in order to examine it for such a crack. The imaging device can also zoom in on this small area to take an enlarged image thereof. As a result, the probability of overlooking extremely fine cracks can be reduced enormously.

Before the finished object is sintered, it can be printed using a binder jetting process, for example. Metallic powder particles are fused together in layers by a binder in this binder jetting process. The object obtained in this manner is also referred to as a "green part" in German ["Grünteile"]. These green parts are normally very porous, and do not have good material properties. These green parts can be sintered in a sintering furnace to improve their mechanical properties. The object referred to in the framework of the present disclosure is preferably such a sintered object. The sintering results in a reduction in porosity, which also results in a shrinkage of the object. Cracks may form as a result of this shrinkage. Defects resulting from the sintering process, specifically cracks, in particular in the surface of the finished object, are therefore preferably searched for. Instead of the binder jetting process, other 3D printing processes can also be used to produce the object. The inspection method can also be used analogously for these objects as well.

The imaging device as disclosed herein can be a simple camera. The imaging device can also include a single camera or numerous cameras. A single stationary camera is preferably used for the process, as shall be explained in greater detail below. This makes the inspection process even simpler and more efficient.

The present disclosure also relates to an inspection device for checking an object produced by a sintering process for defects, wherein the inspection device includes an imaging device for recording at least one image of at least part of the object, and a checking module for checking whether a defect can be identified in the object in at least one image thereof. The inspection device also includes a prediction module that is configured to predict a potential defect in the object before recording the at least one image, and if a predefined prerequisite is satisfied, to determine at least one imaging parameter on the basis of the prediction, wherein the inspection device is configured to record the at least one image with an imaging device on the basis of the at least one imaging parameter.

The advantages described in conjunction with the method according to the present disclosure, and its various embodiments, also apply analogously to the inspection device according to the present disclosure. Furthermore, the features specified in conjunction with the method according to the present disclosure and its various embodiments enable the development of the inspection device through further corresponding objective features. Accordingly, any developments of the inspection device according to the present disclosure that exhibit features that have already been described in conjunction with the developments of the method according to the present disclosure, also belong to the present disclosure. For this reason, the corresponding developments of the inspection device according to the present disclosure shall not be described again herein.

The inspection device can also include a positioning device described herein, which positions the object in relation to the imaging device on the basis of at least one imaging parameter. Furthermore, the prediction module can be configured to execute a computer simulation of a sintering process, also referred to as a sintering simulation.

The present disclosure also comprises the combination of features in the embodiments described herein.

BRIEF DESCRIPTION OF THE DRAWINGS

Exemplary embodiments of the present disclosure shall be described below in reference to the figures. Therein.

DETAILED DESCRIPTION

Figure 1:
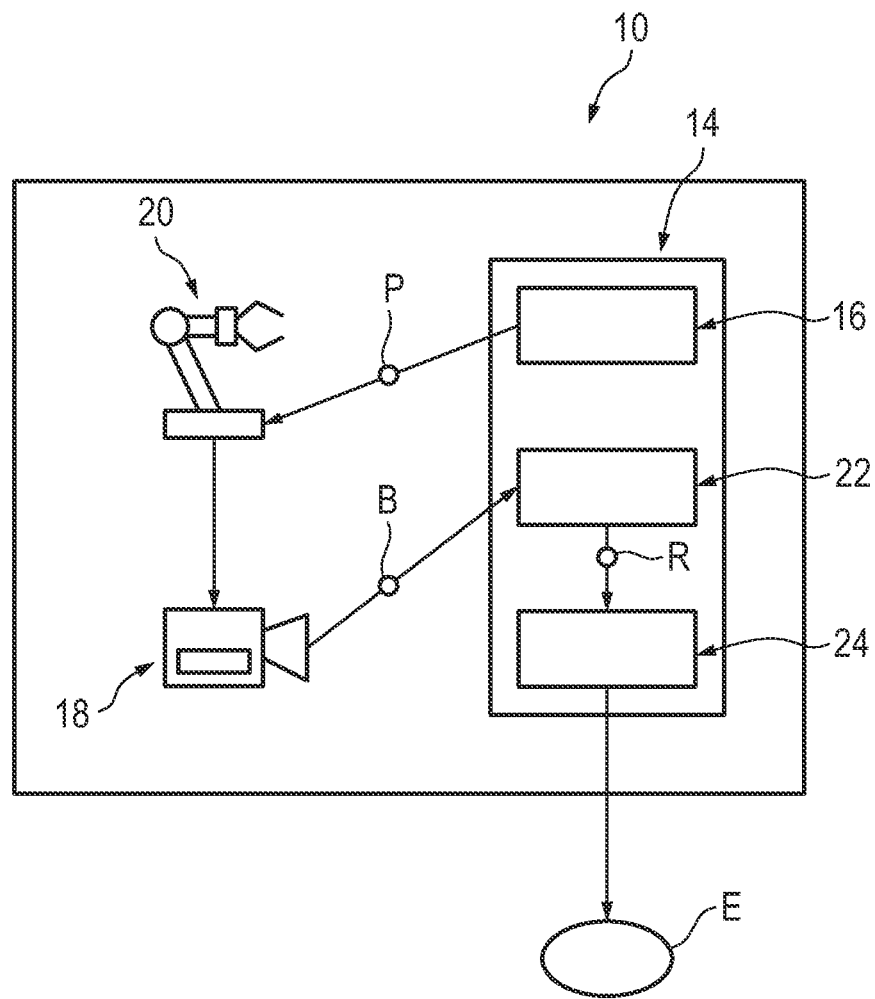
FIG. 1 shows a schematic illustration of an inspection device for checking an object produced by a sintering process for potential defects in accordance with some aspects of the present disclosure.

The exemplary embodiments explained below are preferred exemplary embodiments of the present disclosure. The components described in the exemplary embodiments are each individual features of the present disclosure that are to be regarded independently of one another, which each also develop the present disclosure independently of one another and are thus also to be regarded individually or in combinations other than those shown as components of the present disclosure. Furthermore, the exemplary embodiments described herein can also be supplemented by features other than those already described.

Elements having the same functions are each given the same reference symbols in the figures.

In some examples, an inspection device for checking an object produced by a sintering process for defects may include predefined prerequisites that involves anticipating a possible defect in the object on the basis of the prediction. By way of example, it may be the case that no inspection will take place, i.e., no image is made of the object, if no defect or potentially defective area of the object is anticipated. Alternatively, even if no defective area of the object is anticipated, at least one image, preferably numerous images, are made of the object, in order to then search for any possible defects. By way of example, at least one area is always anticipated on the basis of the prediction, this being the area of the object where a defect is most likely to occur, even if the probability thereof is low. The probability of overlooking any possible defects is also reduced in this manner.

In some examples, the sintering with which the object is produced may be simulated with a computer and the prediction is made on the basis of a result of the simulation. The type of sintering, or the parameters for such a sintering have a substantial effect on whether or where a defect, in particular a crack, might occur in an object. Not only is the geometry of the object, but also the process parameters of the sintering to which the object is subjected, are taken into account in the prediction. This simulation of the sintering, also referred to as the sintering simulation below, makes it possible to determine, for example, which parts of the object have shrunken the most, or which parts have experienced the greatest geometric changes during the sintering. These areas can then be identified as those most vulnerable to potential defects, which can then be more closely examined in order to automatically detect cracks or defects by recording images thereof.

It may also be advantageous if it is anticipated on the basis of the prediction that at least one part of the object is more likely to be damaged, in particular by cracking, according to a pre-definable criterion. This damage may indicate an example of a defect in the object. It is then possible to identify parts of the object that might be damaged, also referred to as focal points, on the basis of the prediction, in particular on the basis of the computer simulation of the sintering process. These areas therefore exhibit an increased probability that they will be damaged. Such damage relates in general to the surface of the object. Damage is also understood to mean small parts of the object being broken off. Damage preferably relates to a crack, or numerous cracks.

According to the pre-definable criterion, an area on the object can be defined that exhibits a higher probability that it will become damaged in that this area is more likely to become damaged than other areas on the object. This probability does not necessarily have to exceed a defined threshold value. Nevertheless, a threshold value for such a probability can still be defined by the pre-definable criterion, for example. This area can then be associated with an increased probability according to the pre-definable criterion, if this probability exceeds the specific, pre-definable threshold value. The probability of damage can be calculated according to pre-definable metrics. Determining factors for calculating such a probability can be stress loads to the object in the areas in question, or the extent of shrinkage in these areas, etc. Such a probability can be determined particularly precisely if the aforementioned computer simulation is used for the prediction, which simulates the sintering process with which the object is produced. It is also possible to simulate the geometric changes to the object in the course of the sintering with such a computer simulation, and thus also simulate crack formation in specific areas on the object, for example. The areas that then exhibit cracks at the end of the sintering process in the computer simulation can then represent those areas on the object that are most likely to be damaged. Cracks can then be searched for in a targeted manner in these areas on the object, in particular in that images are made of these areas, and these images are then analyzed for such cracks.

In some examples, the at least one imaging parameter determines an imaging perspective from which the at least one area on the object is recorded. This imaging perspective is based in turn on the areas that have been classified as having a high probability of exhibiting damage, this being such that these areas are visible from the imaging perspective assigned thereto, e.g., visible in an image that has been made from this imaging perspective. In other words, it is then possible to determine which parts of the object will potentially become damaged on the basis of the prediction, in particular on the basis of the sintering simulation. In order to then take suitable images of these areas, an imaging perspective is first determined on the basis of these identified or predicted areas, from which the imaging device then takes an image of the object such that this area is visible in the image. As a result, images can be made in a targeted manner of those areas that exhibit an increased potential of becoming damaged. This significantly increases the probability that any defects, in particular cracks, will be detected in a particularly efficient manner, because there is no need to take images of areas that have no potential for becoming damaged.

Alternatively or additionally, the imaging parameters can also determine an enlargement vector or zoom factor for the imaging device, with which the image of the area of the object is to be recorded. This may be particularly advantageous if a particularly small crack is to be found. It is possible to select a greater enlargement factor for detecting these fine cracks. This increases the probability that small cracks will also be found on the basis of such images. It is also possible to anticipate whether small or large cracks can be expected in an area on the basis of the prediction, in particular on the basis of the sintering simulation. This adjustment possibility further increases the efficiency of the method.

In some examples, the object may be positioned in relation to the imaging device by means of an automatic positioning device prior to recording the image on the basis of the at least one imaging parameter, such that the at least one subsequent imaging takes place from the imaging perspective determined in this manner. In other words, the object may be automatically positioned and oriented on the basis of the determined imaging perspective from which the area of the object is to be recorded by the imaging device, in particular by means of the aforementioned positioning device. This has the advantage that the imaging device itself does not have to be designed such that it can be repositioned and/or reoriented. If instead, the object is simply placed on a surface, and then photographed from various perspectives using a moving imaging device, it would not be possible, for example, to take an image of the undersurface of the object on which it is lying. If instead, the object is placed in different positions and/or orientations, the object can then be photographed from every desired perspective.

The positioning device can be a robot or a robot arm, for example. This positioning device can also have a gripping component with which it can grab the object, for example. This gripping component can be rotated about numerous axes and/or moved in numerous spatial directions, such that the object can be placed in every possible position and orientation in relation to the imaging device.

In some examples, the imaging device itself may be a stationary camera. The imaging device thus remains in place when recording images of the object from different perspectives. This results in a particularly simple and inexpensive design for the imaging device.

In some examples, if potential defects are anticipated in different areas on the object based on the prediction, each anticipated area is assigned an imaging perspective, and an image of each area is recorded from the assigned imaging perspective, wherein the object is positioned by the automatic positioning device for each image of the object, such that the subsequent imaging takes place from the determined imaging perspective. In other words, the object can be moved by the positioning device to a new position and/or orientation in relation to the imaging device between each successive photograph. The positioning device can be controlled on the basis of the at least one imaging parameter that determines the imaging perspective, for example. In other words, each imaging parameter can be determined on the basis of the prediction, which in turn defines the imaging perspective for an area determined on the basis of the prediction. The object does not necessarily have to be held in place by the positioning device during the imaging, and instead it can be placed on a surface, in particular such that the area that is to be visible in the image from the imaging perspective assigned thereto is also visible from the perspective of the imaging device. If instead, the object is held in place by the positioning device during the imaging process, this then has the advantage that it is possible to set a predefined perspective even more precisely.

In some examples, it is checked whether a defect in the object, such as a crack, can be detected on the basis of the at least one image, by means of computer vision, and if a defect is detected, the defect is reproduced on a computer-generated geometric model of the object. This geometric model can be provided in the form of a CAD model, for example. The crack detection by means of computer vision enables a particularly reliable detection of cracks on the basis of the images that have been recorded. Computer vision processes are sufficiently known from the prior art, and there is therefore no need to explain them here. The particularly large advantage of this approach is that cracks cannot only be reliably detected in this manner, but also these cracks can be precisely identified in terms of their positions and shapes. In other words, the position and the course of such a crack can also be determined on the basis of an image in which a crack has been detected. This makes it possible to reproduce the crack precisely in terms of its position on the computer-generated geometric model of the object. Preferably, the computer-generated geometric model of the object that is the basis for the 3D printing by means of which the object is produced is used for this. In other words, such a geometric model is already available, and it can be advantageously used to reproduce the cracks detected thereon in precisely the same position in which they occur on the object. This has the advantage that the geometric model does not have to be created in an additional step, thus reducing the overall difficulty in carrying out the process.

It is also possible to classify a detected defect, in particular a crack, with regard to its size, and the defect is then documented along with its classification. In other words, cracks can be classified in terms of their size, e.g., their lengths and/or depths, and the cracks can then be documented along with their associated positions and courses as well as their classifications, i.e. as large, medium, or small. The documentation of the position or course of the position for the crack can take place in the form of a reproduction of the detected crack on the geometric model.

A signal can be output and/or another process can be activated on the basis of these detected crack parameters, such as their positions and/or classifications, for example. It is particularly advantageous if the crack parameters documented in this manner are used, for example, to modify or adjust setting parameters for the sintering process. The exact knowledge of the position of the crack makes it possible to advantageously adjust the sintering parameters such that a newly produced object of the same type will have a reduced probability of developing such cracks.

In some examples, the detected cracks can be reproduced using a geometric coordinate transformation on the geometric model, in particular the 3D CAD model. The cracks are determined digitally in the 3D Euclidean geometric space using the imaging data. The cracks are preferably filtered according to their type, i.e., classified, according to classifications including "microcracks" and "macrocracks". A defined limit can be established for this, e.g., for the length and/or depth of such a crack, in which a crack is classified as a microcrack if it falls below this limit, and as a macrocrack if it lies above this limit. Such a filtering of the types of cracks, or sorting of these cracks according to size, in particular into the two categories of microcracks and macrocracks, can be carried out, not on the basis of the detected crack, but instead on the basis of the cracks anticipated in the sintering simulation. As stated above, it is possible to predict which areas can be anticipated to develop very small cracks, i.e., microcracks, to record them with a larger enlargement factor, in order to better detect these microcracks. Knowledge of the type of crack can also be used as a starting parameter for the computer vision process for analyzing the images, in order to increase detection probability. In other words, it is possible to advantageously determine in a computer vision process which type of crack is to be searched for in an image, or which type of crack can be expected therein. The search parameters for the computer vision process can thus be adjusted accordingly. The filtering or classification of the cracks according to size has numerous advantages, regardless of whether this relates to cracks that are actually detected, or anticipated cracks.

FIG. 1 shows a schematic illustration of an inspection device 10 for checking an object produced by sintering for potential defects R according to some aspects of the present disclosure. In this example, the inspection device 10 can be used to check an object 12 such as that shown in FIG. 2, which is printed by means of a 3D printing process and subsequently sintered, for potential cracks R serving as examples of such defects, or damages. A binder jetting process can be used as the 3D printing process. In a binder jetting process, a binder is printed onto a bed of powder to bond the powder particles in layers. The component produced in this manner is referred to as a "green part." These green parts are normally very porous and therefore do not have good material properties. To improve these mechanical properties of green parts they are subsequently sintered in a sintering furnace. In doing so, the green parts are heated. The porosity is reduced during the sintering, such that the object 12 shrinks. Cracks R may form or develop during this shrinking. The crack formation may occur for a variety of reasons. The processing parameters for the sintering may be adjusted and optimized to prevent cracks R from forming. It must be known, however, precisely where the cracks R are formed on the finished object 12 for this, and in particular how these cracks R are formed. Parameters for the sintering can then be derived therefrom in order to prevent crack formation in the production of subsequent components, or at least to reduce the extent thereof.

This inspection device 10 makes it possible to detect, filter, classify, document, and reproduce cracks R in an object 12 on a CAD model, in particular a 3D CAD model. The inspection device 10 has a control unit 14 for this. This control module contains a prediction module 16. The prediction module 16 creates a computer simulation of the sintering process with which the object 12 is produced. The prediction module 16 is therefore designed to physically simulate the sintering procedure or sintering process that the object 12 is subjected to. Areas on the object 12 can be identified in which cracks R are likely to be formed on the basis of such a simulation. These areas that are likely to exhibit damage are also referred to as focal points. These focal points on the object 12 are therefore simulated in the simulation by the prediction module 16. It is therefore advantageously known where to search for damages, in particular cracks R, in the object 12. The inspection device 10 has a camera 18 for this, functioning as an example of an imaging device. In order to record images B of the identified areas on the object 12 that have a high potential for damages in a targeted manner, instead of moving the camera 18 itself around the object 12, the object 12 is positioned according to predefined perspectives from which this object 12 is to be imaged by means of the camera 18. The inspection device 10 also has a positioning device for this, which is formed by a robot arm 20 in this example.

This robot arm 20 is designed to grab the object 12 and bring it into positions in relation to the camera 18 corresponding to these perspectives. Recording parameters P are sent to the robot arm 20 by the prediction module 16 for this, which define the positions and/or orientation in which the object 12 is to be brought in relation to the camera 18 in order to photograph this object 12 from the imaging perspectives determined on the basis of the results of the simulation. In other words, the imaging perspectives for the areas of the object 12 identified as likely to be damaged on the basis of the results of the simulation are determined by the prediction module 16. In particular, these perspectives are determined such that an imaging of this object 12 from such a perspective comprises such an area of the object 12 that has an increased potential of being damaged. A relevant position and orientation of the object 12 in relation to the camera 18 can then be determined for such a respective perspective, and these positions or orientations can be sent to the gripping arm or robot arm 20 in the form of the imaging parameter P. The robot arm 20 is then designed to bring the object 12 successively into these positions specified by means of the imaging parameter P. After the robot arm 20 has brought the object 12 into a first position, an image is taken of the object 12 by the camera. The robot arm 20 subsequently brings the object 12 into a next position specified by means of the imaging parameter P, and the camera then takes another image P of the object 12. This is repeated until the object 12 has been photographed from all of the defined perspectives.

The imaging parameters P determine not only the perspectives or corresponding positions and/or orientations, but also a zoom factor for the camera 18, by way of example. It is also possible to predict by means of the simulation by the prediction module 16, which types of cracks R can be expected, in particular whether macrocracks or microcracks can be expected. To better be able to extract microcracks form the images B, it makes sense here to select an imaging with a higher enlargement factor. This too can be specified by the imaging parameters P. The images B recorded by the camera 18 are then sent to the control unit 14, in particular an examination module 22. This examination module 22 is designed to analyze the images B sent to it by means of computer vision instructions, and detect damages, in particular cracks R, on the basis thereof. The detected cracks R can then be sent to an evaluation module 24 by the examination module 22. This evaluation module 24 is designed to filter and sort the detected cracks, e.g., according to their size, and also reproduce a three-dimensional geometric model of the object 12.

This reproduction can take place by means of a geometric coordinate transformation. The three-dimensional geometric model can be in the form of a 3D CAD model, for example. This 3D CAD model can be the initially provided geometric model for producing the object 12. In other words, the geometric model that was initially used for the 3D printing of the object 12 can be used as the geometric model. There is therefore no need to create a new geometric model of the object 12. The cracks R are digitally determined in the 3D Euclidean geometric space with the data for this model. As a result, cracks can be documented precisely at their positions on the object 12. This is particular advantageous if the process parameters for the sensor process have to be reset on the basis of these results E that are output by the control unit 14, in particular the evaluation module 24, in order to reduce the numbers and/or sizes of cracks R in the subsequently produced objects. The results E can therefore be output as a 3D CAD model of the object 12 with position corrections for detected cracks R reproduced thereon, wherein the respective cracks R are also classified in a predefined number of different groups with regard to their size.

The prediction module 16, examination module 22, and evaluation module 24 can also represent functional modules, e.g. provided in the form of software. They do not necessarily have to be incorporated in a common physical device. By way of example, they can also run on different computers, or in general control units, and separated spatially from one another.

In other words, the control unit 14 itself does not have to be a structural unit, and instead can be separated into numerous structural units, each of which can comprise respective control units, and in particular also be spatially distributed.

Figure 2:
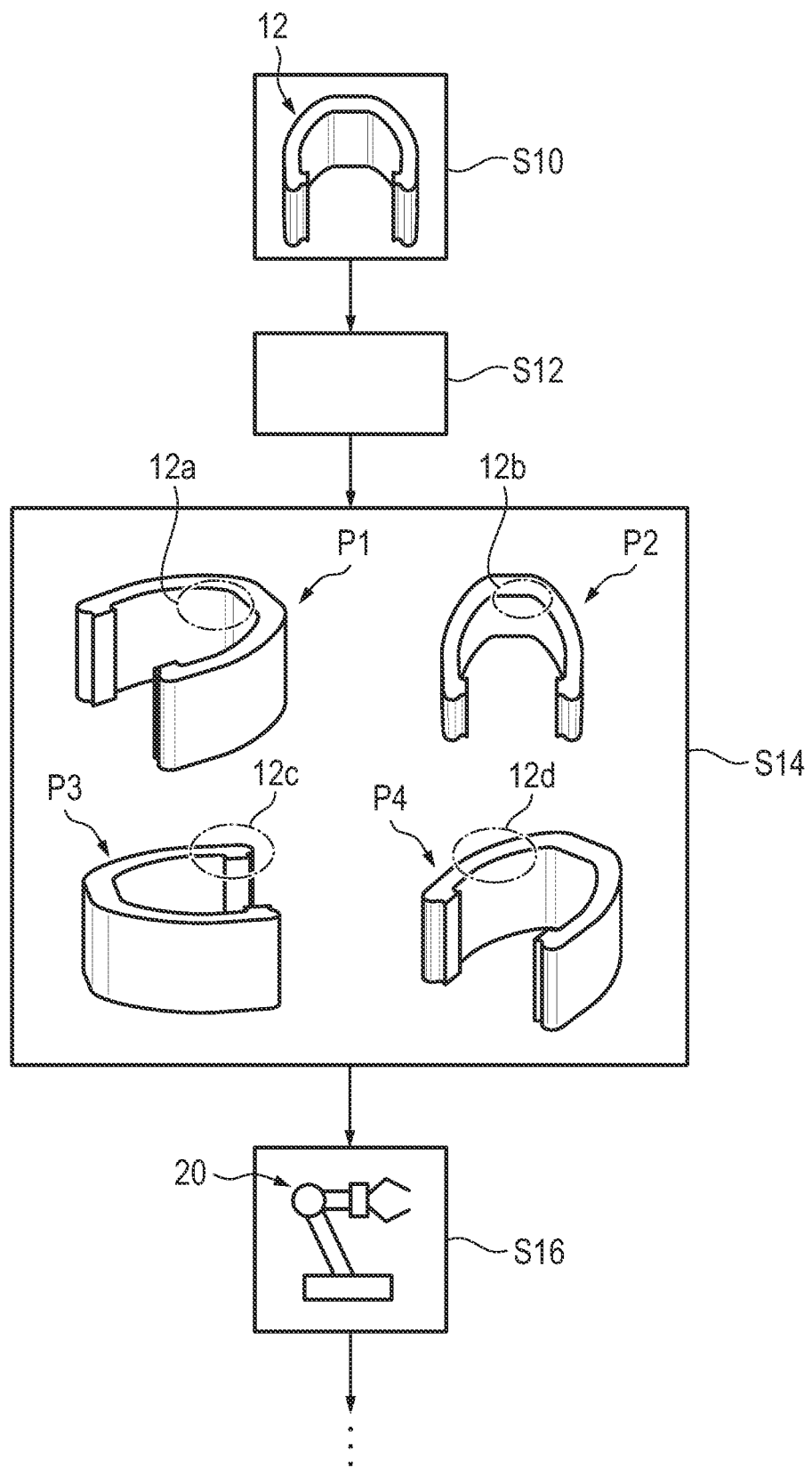
FIG. 2 shows a schematic illustration of a flow chart illustrating a first part of a method for checking a finished object for potential defects in accordance with some aspects of the present disclosure.
Figure 3:
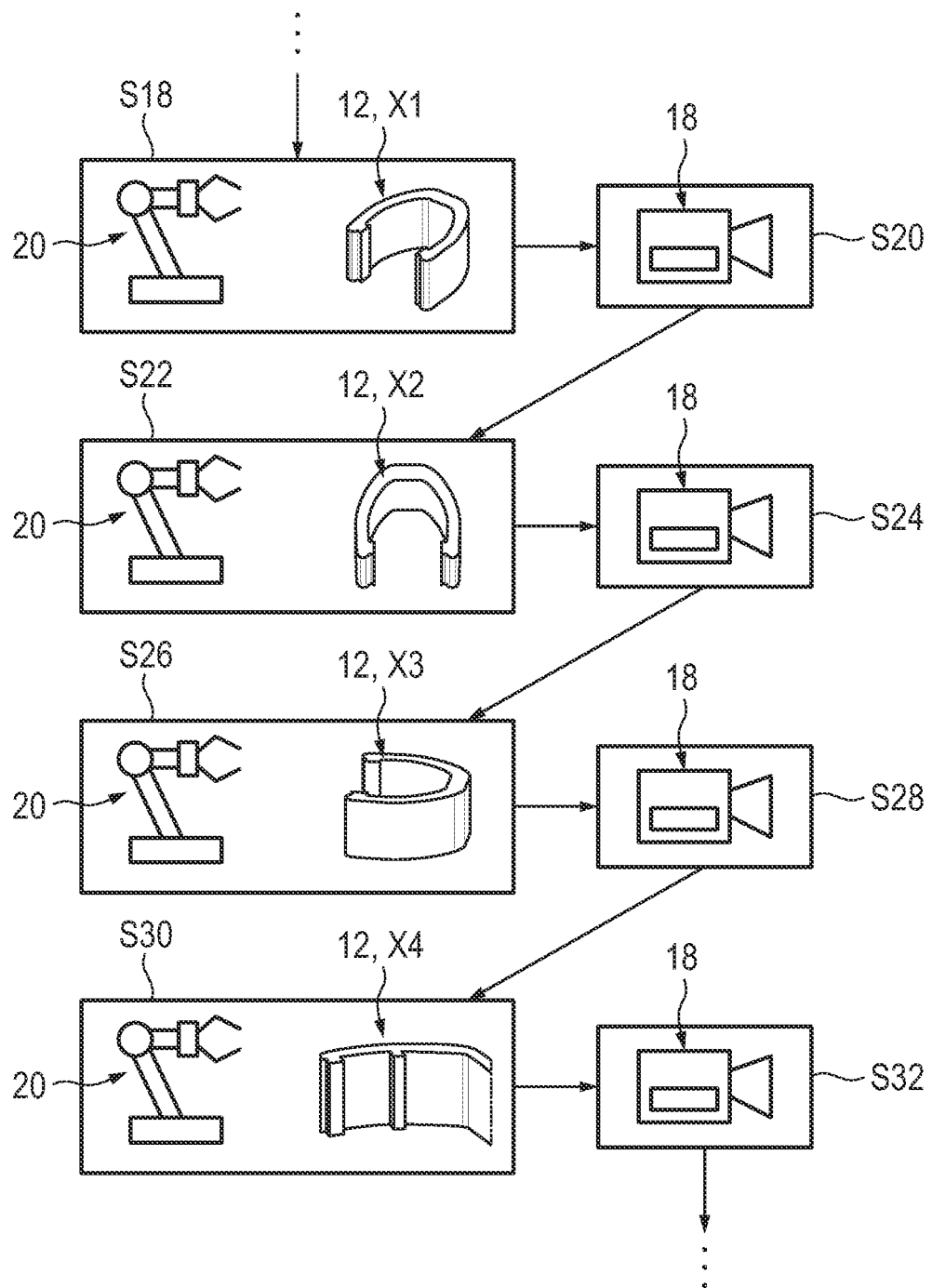
FIG. 3 shows a schematic illustration of a flow chart illustrating a second part of the method for checking the finished object according to some aspects of the present disclosure.
Figure 4:
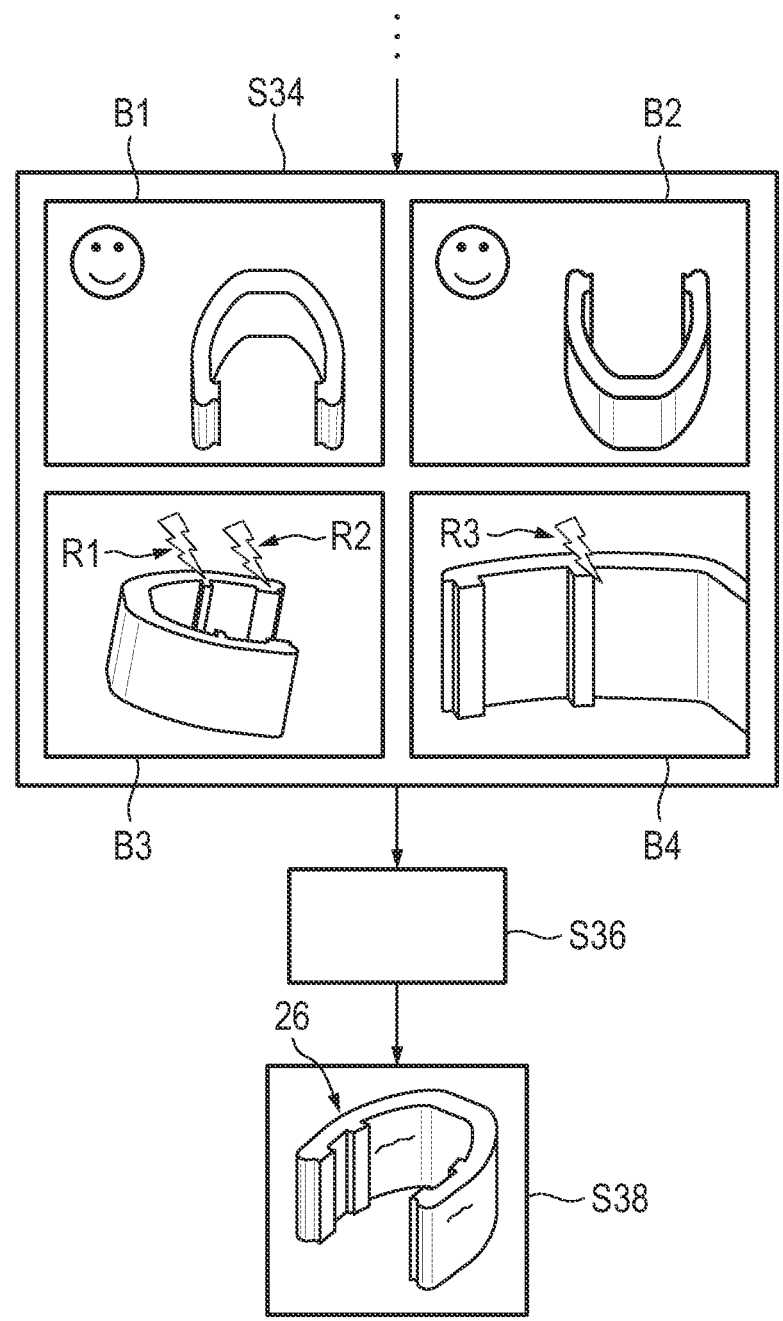
FIG. 4 shows a schematic illustration of a flow chart illustrating a third part of the method for checking the finished object in accordance with some aspects of the present disclosure.

FIG. 2, FIG. 3, and FIG. 4 show respective parts of a flow chart illustrating a method for checking an object produced by sintering according to another exemplary embodiment of the present disclosure. This method starts with step S10 in FIG. 2, in which this finished object 12 is first obtained. It can be printed with a binder jetting process, for example, and subsequently sintered. This object 12 may then exhibit defects or damages, e.g., in the form of cracks R. These are then to be detected and documented with the process described below. A computer simulation is first carried out for this in step S12, which precisely simulates this sintering process with which the object 12 is produced. "Precisely simulates this sintering process" is understood to mean that the procedure and process parameters, e.g., duration, temperature, etc. are used as the starting parameters for this situation.

Areas 12a, 12b, 12c, 12d of the object 12 that are likely to become damaged are identified or anticipated on the basis of such a physical sintering simulation, which is simulated in step S12. An imaging perspective P1, P2, P3, P4 can also be determined for each area 12a, 12b, 12c, 12d. The identification of these areas 12a, 12b, 12c, 12d that are likely to exhibit damages and the determination of corresponding imaging perspectives P1, P2, P3, P4 takes place in step S14. The imaging parameters P defining these imaging perspectives P1, P2, P3, P4 are subsequently sent to a robot arm 20, serving as an example of a positioning device, in step S16. The object 12 can also be placed in a camera station. By way of example, the object 12 can be transported to such a camera station by a conveyor belt. If, for example, numerous such objects 12 are to be successively examined for potential damages such as cracks, the respective objects 12 can be placed on such a conveyor belt, and thus successively transported to the camera station. The camera 18 described above is located in this camera station. The camera 18 is synchronized with the robot arm 20. The robot arm 20 is also in the camera station. The object 12 can then be photographed from various perspectives with the camera 18. The object 12 is brought into the corresponding positions by the robot arm 20. This is illustrated in FIG. 3. The robot arm 20 brings the object into a first position X1 in step S18 therein. This first position X1 corresponds, for example, to the imaging perspective P1 determined by means of the simulation. Step S18 is executed after step S16, in particular.

Once the object 12 is brought into this first position X1, the camera 18 synchronized to the robot arm 20 then takes an image of the object 12. The term "synchronization" is understood to mean that the camera 18 is informed when the robot arm 20 has positioned the object 12 such that an image of this position X1 can then be made by the camera 18. Once the camera 18 has taken such an image B, the robot arm 20 is informed of this, such that it can then bring the object 12 into a new position X2, and so on. In other words, the object 12 is first brought into a predefined position X1 by the robot arm 20 in step S18, and the camera 18 subsequently takes an image B of the object 12 in step S20. The robot arm 20 subsequently repositions the object 12 in step S22, and places it in the next predefined position X2. Another image B is then taken by the camera 18 in step S24. The object 12 is then repositioned in step S26, such that it is brought into the next position X3, and the camera 18 takes a new image of the object 12 from this new imaging perspective in step S28. In the last step S30, the object 12 is placed in the next predefined position X4, and the camera 18 takes a new image B of the object 12 in this new position X4 in step S32. The object 12 can thus be photographed from various perspectives, in particular the predefined perspectives.

The robot arm 20 grabs the object after each image B, and rotates and places it in accordance with a new predefined perspective. Because the robot arm 20 is connected to the physical sinter simulation in which areas with damage potential have been identified, the robot arm 20 grabs the object 12 and rotates it in accordance with the next predefined perspective from which the object 12 is to be photographed, and from which cracks R can presumably be seen and expected. This rotation and repositioning take place until all of the focal points have been covered and photographed. In the subsequent step S34, illustrated in FIG. 4, the images B are analyzed by means of computer vision, and potential damages or cracks R are detected. By way of example, four images B1, B2, B3, B4 taken from different perspectives of the object 12 are presented herein. No cracks could be detected on the basis of the first two images B1, B2 in the present example. Two cracks R1, R2 were detected on the basis of the third image B3, one of which is a macrocrack R1, and the other of which is a microcrack R2. A crack R3 is also detected on the basis of the fourth image B4. The detected cracks R1, R2, R3 can then be sorted and filtered in step S36, in particular with regard to their size. The precise position of the cracks R1, R2, R3 are also reproduced on a geometric 3D model 26 of the object 12 in step S38, and thus documented. These results can be output, in particular, e.g., shown to a user, and/or provided to another system, e.g. to adjust the sintering parameters, and/or used for controlling another subsequent process.

In summary, it can be said that areas subject to damages can be identified on the basis of the results of the simulation, so-called focal points, which then define the perspectives for the robot arm 20 in which the object 12 is then to be brought from the perspective of the camera 18. This robot arm 20 lifts the part, i.e. the respective object 12, and brings it into the necessary imaging perspectives from which it is to be photographed by the camera 18. Potential cracks R are then detected by means of computer vision, which are then sorted and filtered, and their precise positions are then reproduced on a 3D model and documented.

Generally speaking, the present disclosure advantageously makes it possible to filter cracks and sort them according to type, in particular as microcracks and macrocracks. This is enabled by simulation and image recognition results. The cracks can also be digitally reproduced in the 3D Euclidean geometric space. Printed objects can therefore be documented particularly quickly with such a method, cracks and damages can be precisely and automatically detected, cracks can be filtered and sorted according to type, and the cracks can also be digitally reproduced in 3D Euclidean geometric space. In addition to numerous advantageous application possibilities within the automotive industry, there are also numerous advantageous application possibilities outside the automotive industry, in particular in all fields that involve additive production of objects. The method can also be used in the fields of powder metallurgy and MIM (metal injection molding) industries. Aircraft and aerospace industries also represent potential fields of application.

LIST OF REFERENCE SYMBOLS 10 inspection device
12 object
12a area with damage potential
12b area with damage potential
12c area with damage potential
12d area with damage potential
14 control unit
16 prediction module
18 camera
20 robot arm
22 examination module
24 evaluation module
26 model
B image
B1 image
B2 image
B3 image
B4 image
E result
P imaging parameter
P1 imaging perspective
P2 imaging perspective
P3 imaging perspective
P4 imaging perspective
R crack
R1 crack
R2 crack
R3 crack
X1 position
X2 position
X3 position
X4 position
S10 step
S12 step
S14 step
S16 step
S18 step
S20 step
S22 step
S24 step
S26 step
S28 step
S30 step
S32 step
S34 step
S36 step
S38 step

The invention claimed is:

1. A method for checking an object produced by a sintering process for potential defects via an inspection device, comprising:
    recording at least one image of at least part of the object via an imaging device in the inspection device, if at least one predetermined prerequisite is satisfied;
    checking whether a defect in the object can be detected in the at least one image with the inspection device; and
    executing prediction processing for the inspection device relating to a potential defect in the object prior to the recording of the at least one image, and, if the at least the predefined prerequisite is satisfied, determining at least one imaging parameter on the basis of the prediction; and
    recording the at least one image on the basis of the at least one determined imaging parameter.

2. The method of claim 1, wherein the predetermined prerequisite requires that at least one potential defect of the object is anticipated on the basis of the prediction.

3. The method of claim 2, wherein at least one area of the object is anticipated on the basis of the prediction in which it is likely that damage, may occur according to a predefined criterion.

4. The method of claim 1, wherein the sintering process with which the object is produced is simulated via a computer simulation, and the prediction processing is executed on the basis of the results of the simulation.

5. The method of claim 1, further comprising determining an imaging perspective from which the at least part of the object is imaged, based on the at least one imaging parameter.

6. The method of claim 1, further comprising positioning the object relative to the imaging device via an automatic positioning device on the basis of the at least one imaging parameter, prior to recording the at least one image, such that subsequent imaging takes place from the determined imaging perspective.

7. The method of claim 6, wherein if numerous potential defects are anticipated in different areas on the object on the basis of the prediction, each predicted area is assigned an imaging perspective, and an image is recorded of each area from the assigned imaging perspective, wherein the object positioned via the automatic positioning device prior to each imaging, such that the subsequent imaging is made from the defined imaging perspective.

8. The method of claim 1, further comprising checking whether the defect can be detected in the object on the basis of the recorded at least one image via computer vision, and if a defect is detected, reproducing the defect as a computer generate geometric model of the object.

9. The method of claim 8, wherein if the defect is detected, the defect is classified with regard to its size, and the defect is stored, along with its classification.

10. An inspection device for checking an object produced by a sintering process for potential defects, comprising:
an imaging device configured to record at least one image of at least part of the object; and
an examination module, operatively coupled to the imaging device, wherein the examination module and imaging device are configured to
record at least one image of at least part of the object via an imaging device in the inspection device, if at least one predetermined prerequisite is satisfied;
check whether a defect in the object can be detected in the at least one image with the inspection device; and
execute prediction processing for the inspection device relating to a potential defect in the object prior to the recording of the at least one image, and, if the at least the predefined prerequisite is satisfied, determining at least one imaging parameter on the basis of the prediction; and
record the at least one image on the basis of the at least one determined imaging parameter.

11. The inspection device of claim 10, wherein the predetermined prerequisite requires that at least one potential defect of the object is anticipated on the basis of the prediction.

12. The inspection device of claim 11, wherein at least one area of the object is anticipated on the basis of the prediction in which it is likely that damage, may occur according to a predefined criterion.

13. The inspection device of claim 10, wherein the wherein the examination module and imaging device are configured to simulate the sintering process with which the object is produced via a computer simulation, and the prediction processing is executed on the basis of the results of the simulation.

14. The inspection device of claim 10, wherein the examination module and imaging device are configured to determine an imaging perspective from which the at least part of the object is imaged, based on the at least one imaging parameter.

15. The inspection device of claim 10, further comprising an automatic positioning device, configured to position in the object relative to the imaging device on the basis of the at least one imaging parameter, prior to recording the at least one image, such that subsequent imaging takes place from the determined imaging perspective.

16. The inspection device of claim 15, wherein if numerous potential defects are anticipated in different areas on the object on the basis of the prediction, each predicted area is assigned an imaging perspective, and an image is recorded of each area from the assigned imaging perspective, wherein the object positioned via the automatic positioning device prior to each imaging, such that the subsequent imaging is made from the defined imaging perspective.

17. The inspection device of claim 10, wherein the examination module and imaging device are configured to check whether the defect can be detected in the object on the basis of the recorded at least one image via computer vision, and if a defect is detected, reproducing the defect as a computer generate geometric model of the object.

18. The inspection device of claim 17, wherein if the defect is detected, the defect is classified with regard to its size, and the defect is stored, along with its classification.

19. A method for checking an object produced by a sintering process for potential defects via an inspection device, comprising:
simulating the sintering process with which the object is produced via a computer simulation;
recording at least one image of at least part of the object via an imaging device in the inspection device, if at least one predetermined prerequisite, requiring that at least one potential defect of the object is anticipated on the basis of a prediction, is satisfied;
checking whether a defect in the object can be detected in the at least one image with the inspection device; and
executing prediction processing for the prediction for the inspection device relating to a potential defect in the object prior to the recording of the at least one image on the basis of the results of the simulation, and, if the at least the predefined prerequisite is satisfied, determining at least one imaging parameter on the basis of the prediction; and
recording the at least one image on the basis of the at least one determined imaging parameter.

20. The method of claim 19, further comprising positioning the object relative to the imaging device via an automatic positioning device on the basis of the at least one imaging parameter, prior to recording the at least one image, such that subsequent imaging takes place from the determined imaging perspective,
wherein if numerous potential defects are anticipated in different areas on the object on the basis of the prediction, each predicted area is assigned an imaging perspective, and an image is recorded of each area from the assigned imaging perspective, wherein the object positioned via the automatic positioning device prior to each imaging, such that the subsequent imaging is made from the defined imaging perspective.

* * * * *